(12) United States Patent
Bernhard

(10) Patent No.: US 9,658,103 B2
(45) Date of Patent: May 23, 2017

(54) MEASURING APPARATUS FOR MEASURING THE OPTICAL PROPERTIES OF A MEDIUM USING A LIGHT SOURCE AND LIGHT RECEIVER AS WELL AS A DISPERSING ELEMENT

(71) Applicant: Endress + Hauser Conducta Gesellschaft für Mess- und Regeltechnik mbH + Co. KG, Gerlingen (DE)

(72) Inventor: Ralf Bernhard, Stuttgart (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 0 days.

(21) Appl. No.: 14/073,051

(22) Filed: Nov. 6, 2013

(65) Prior Publication Data
US 2014/0131561 A1 May 15, 2014

(30) Foreign Application Priority Data
Nov. 9, 2012 (DE) .......................... 10 2012 110 749

(51) Int. Cl.
*G06M 7/00* (2006.01)
*G01J 3/10* (2006.01)
(Continued)

(52) U.S. Cl.
CPC . *G01J 3/10* (2013.01); *G01J 3/12* (2013.01); *G01J 3/14* (2013.01); *G01J 3/18* (2013.01);
(Continued)

(58) Field of Classification Search
CPC ....................................................... G01J 3/12
(Continued)

(56) References Cited

U.S. PATENT DOCUMENTS

| 7,596,070 B2 | 9/2009 | Dambach |
| 7,659,987 B2 | 2/2010 | Utsunomiya |

(Continued)

FOREIGN PATENT DOCUMENTS

| CN | 1436348 A | 8/2003 |
| DE | 19906757 A1 | 12/1999 |

(Continued)

OTHER PUBLICATIONS

German Search Report, German PTO, Munich, Jul. 3, 2013.

*Primary Examiner* — Thanh Luu
(74) *Attorney, Agent, or Firm* — Christopher R. Powers; PatServe

(57) ABSTRACT

A measuring apparatus, comprising at least a first light source and a second light source for transmitting light; at least one light receiver for receiving light at least of a first received wavelength and a second received wavelength; at least one dispersing element for bending and/or refracting light; wherein the light transmitted by the light sources strikes the dispersing element and is so turned by the dispersing element that it strikes the light receiver. The first light source is arranged at a first angle relative to the dispersing element and the second light source at a second angle relative to the dispersing element, wherein the second angle differs from the first angle. The first angle is so embodied that the wavelength of the light turned by the dispersing element corresponds to the first received wavelength, and wherein the second angle is so embodied that the wavelength of the light turned by the dispersing element corresponds to the second received wavelength.

10 Claims, 1 Drawing Sheet

(51) Int. Cl.
  *G01J 3/12*   (2006.01)
  *G01J 3/14*   (2006.01)
  *G01J 3/18*   (2006.01)
  *G01J 3/42*   (2006.01)

(52) U.S. Cl.
  CPC ......... *G01J 3/42* (2013.01); *G01J 2003/1286* (2013.01)

(58) Field of Classification Search
  USPC ....................................................... 250/221
  See application file for complete search history.

(56) References Cited

U.S. PATENT DOCUMENTS

| | | |
|---|---|---|
| 7,804,588 B2 | 9/2010 | Priesnitz |
| 2003/0058440 A1* | 3/2003 | Scott et al. .................. 356/318 |
| 2003/0165106 A1* | 9/2003 | Dambach et al. ....... 369/112.07 |
| 2006/0245049 A1 | 11/2006 | Knebel |
| 2007/0285666 A1* | 12/2007 | Utsunomiya et al. ........ 356/432 |
| 2012/0080611 A1* | 4/2012 | Jones et al. ................ 250/458.1 |

FOREIGN PATENT DOCUMENTS

| | | |
|---|---|---|
| DE | 10334145 A1 | 2/2005 |
| DE | 102007007040 A1 | 8/2008 |
| WO | 2006030957 A1 | 3/2006 |

\* cited by examiner

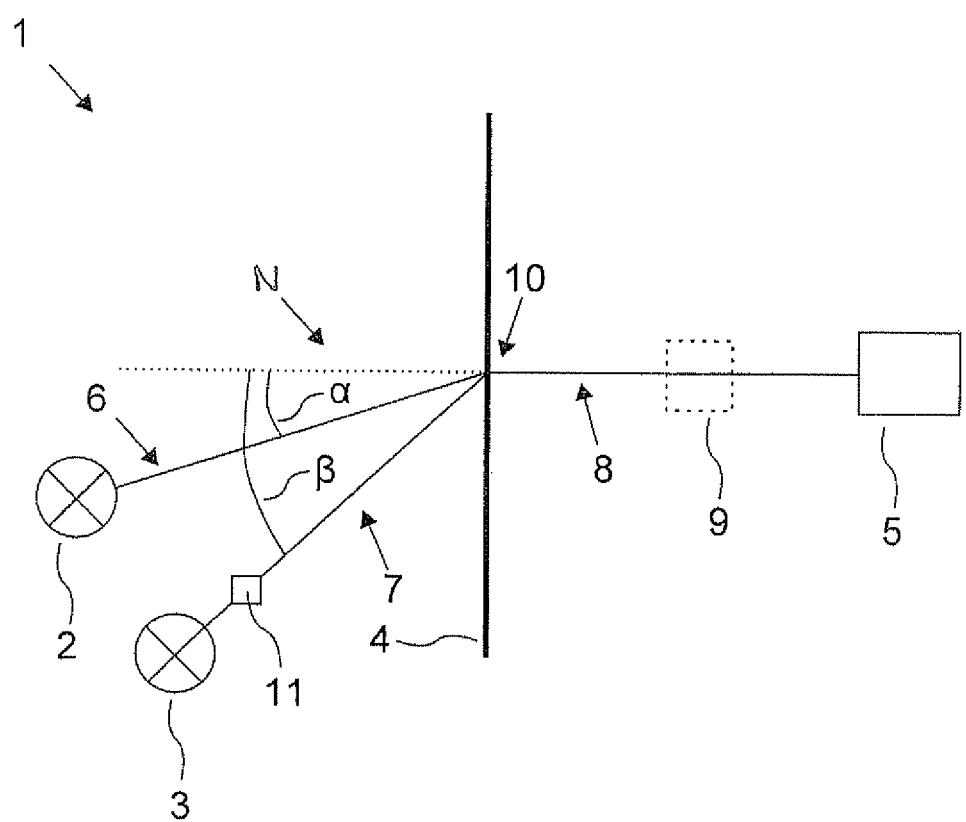

MEASURING APPARATUS FOR MEASURING THE OPTICAL PROPERTIES OF A MEDIUM USING A LIGHT SOURCE AND LIGHT RECEIVER AS WELL AS A DISPERSING ELEMENT

TECHNICAL FIELD

The invention relates to a measuring apparatus for measuring optical properties of a medium.

BACKGROUND DISCUSSION

For optical measurements at different wavelengths, thus, for example, in the case of a spectrometer, one requires either a composable light source for transmitting light and a broadband receiver or a broadband light source for transmitting light and a decomposition of the light into its spectral fractions at the receiver. Here, only the first case will be considered.

"Light" in the sense of this invention is not limited to the visible range of the electromagnetic spectrum, but, instead, can be any wavelength or set of wavelengths, especially also wavelengths of the far ultraviolet (UV) and wavelengths lying in the infrared (IR) range.

Usual embodiments of a composable light source involve, for instance, a broadband light source coupled with a dispersing element (e.g. a prism or an optical grating) or a set of narrowband, individual light sources (e.g. LEDs).

In both cases, light beams of different wavelengths emerge in different directions. If a certain direction, for instance, exactly toward the receiver, is desired, then the light beams must be merged either via a mechanical movement (e.g. a rotation of the grating) or via a fixed optical arrangement (e.g. a semi-transmissive mirror).

SUMMARY OF THE INVENTION

An object of the invention is to provide an arrangement for the construction of a light source with a defined direction of the emerging light, without requiring movable parts or complex optics.

The object is achieved by a measuring apparatus comprising at least a first light source and a second light source for transmitting light, at least one light receiver for receiving light at least of a first received wavelength and a second received wavelength, at least one dispersing element for bending and/or refracting light, wherein the light transmitted by the light sources strikes the dispersing element and is so turned by the dispersing element that it strikes the light receiver. In such case, the first light source is arranged at a first angle relative to the dispersing element and the second light source at a second angle relative to the dispersing element, wherein the second angle differs from the first angle, wherein the first angle is so embodied that the wavelength of the light turned by the dispersing element corresponds to the first received wavelength, and wherein the second angle is so embodied that the wavelength of the light turned by the dispersing element corresponds to the second received wavelength.

It is, thus, possible, without additional mechanical or complex optical systems, to target light of different wavelengths at a receiver.

In a preferred embodiment, the first light source and the second light source have the same emission spectrum. Thus, cost effectively, the same light sources can be used. Moreover, the light sources do not have to be temperature stabilized, since wavelength selectivity is assured by the angle between the respective light source and the dispersing element.

In an advantageous form of embodiment, the first light source and/or second light source transmit(s) broadbandly. Frequently, it is difficult in the case of usually marketed light sources to find the desired wavelength.

Preferably, the first light source and the second light source are LEDs. These can be obtained in large quantities.

Preferably, the first light source and the second light source are white LEDs.

Since light of different wavelengths strikes the receiver, the light receiver is, as much as possible, a broadband light receiver.

In a further development, the dispersing element is a prism, especially a dispersing prism, a reflection grating, a transmission grating, a single- or double slit, a fiber bundle, an interference filter, or a wavelength dependent mirror, especially a dichroic mirror.

In the case of both of the optical gratings—the reflection grating and the transmission grating—these are distinguished by the way in which they function. Furthermore, gratings can be distinguished according to a manufacturing process (thus a blazed grating, holographic grating or imaging grating) or transparency (amplitude grating or phase grating). These optical gratings are likewise suited as the dispersing element.

The measuring apparatus can be a spectrometer, photometer or colorimeter.

In a further development, at least one collimating optics is provided between the first light source, respectively the second light source, and the dispersing element. Thus, the transmitted light can be targeted toward the receiver with yet greater accuracy.

In order to be able to transmit a mixed spectrum to the receiver, the first light source and the second light source preferably transmit simultaneously.

BRIEF DESCRIPTION OF THE DRAWINGS

The invention will now be explained based on the drawing, the sole FIGURE of which shows as follows:

The FIGURE is a schematic illustration of the measuring apparatus of the invention.

DETAILED DISCUSSION IN CONJUNCTION WITH THE DRAWING

The measuring apparatus of the invention in its totality bears the reference character 1 and is shown in the FIGURE.

Measuring apparatus 1 is composed at least of a first light source 2 and a second light source 3. Embodiments with more light sources are quite possible. The light sources 2, respectively 3, radiate light beams 6, respectively 7, in the direction of a dispersing element 4. The light beams after the dispersing element 4 are given the reference character 8. Light beam 8 strikes a light receiver 5. The point on the dispersing element 4 having the shortest distance to the light receiver 5 is referred to as midpoint 10. In the example in the FIGURE, the light beam 8 is perpendicular to the dispersing element 4 and, thus, forms the normal N. Depending on the type of dispersing element 4, this is not necessarily the case. If the dispersing element 4 is, for instance, a prism (see below), a perpendicular arrangement is not possible.

The measuring apparatus 1 can be embodied, for instance, as a spectrometer, a photometer or a colorimeter. In the following, the application as a photometer will be explored.

In photometry, light is used to measure absorption. If one irradiates the solution of an absorbing medium with light, the absorption depends on the spectral properties of the medium, the concentration and the length of the light path in the solution. Photometry permits qualitative and quantitative detection as well as tracing the dynamics of chemical processes of radiation absorbing, chemical compounds.

In the absorption, at least one part of the radiation, e.g. that in a certain wavelength range, is absorbed by the medium. The absorption of a medium depends on composition and concentration of the medium. After passing through a flow through cell 9 containing medium, the radiation, as changed by the absorption, strikes the receiver 5, which outputs a measurement signal dependent on the intensity of the striking radiation. Deduced from the measurement signal can be the absorption/transmission/reflection of the medium and therewith the type and/or composition of the medium, especially the concentration of an analyte in the medium.

With the photometric method as applied for process measurements technology, for example, in the case of monitoring water in lines, gutters and/or clarification plants, the content of various ions, such as e.g. aluminum-, ammonium-, calcium-, chromium-, iron-, manganese-ions, the content of chloride, nitrate, nitrite, phosphate, silicate and sulfide, as well as the content of organic compounds, such as e.g. hydrazine, can be determined. Also, the hardness of an aqueous solution can be ascertained photometrically.

Some media have characteristic absorption bands suitable for photometric detection in the far UV-region, thus especially between 200 nm and 300 nm. Thus, for example, the concentration of nitrate is registered based on absorption of the measured liquid at a wavelength of 214 nm. A further parameter ascertained photometrically in the far UV-region and used especially for monitoring the quality of water is the spectral absorption coefficient, SAC for short, at 254 nm. The SAC at 254 nm serves for detecting the presence of dissolved organic ingredients.

"Light" in the sense of this invention is not limited to the visible range of the electromagnetic spectrum, but, instead, includes as electromagnetic radiation any wavelength, especially radiation in the far ultraviolet (UV) range and in the infrared (IR) wavelength range.

The light sources 2 and 3 have the same emission spectrum and are embodied as LEDs (light emitting diodes). Preferably, broadband light sources are used, thus, for instance, LEDs emitting white light.

Since in the example only a single receiver is used, yet, however, different wavelengths must be received, the light receiver 5 is embodied as a broadband light receiver. The receiver 5, thus, receives light at least of first and second wavelengths.

The light sources 2 and 3 are arranged at angles $\alpha$, respectively $\beta$, relative to the dispersing element 4. More exactly stated, the angle $\alpha$ is the angle between the normal N to the dispersing element 4 and the line between the first light source 2 and the midpoint 10 and the angle $\beta$ is the angle between the normal N to the dispersing element 4 and the line between the second light source 3 and the midpoint 10.

A further option is to place a collimating optics 11 between the light sources 2 and 3 and the dispersing element 4. In the FIGURE, such a collimating optics 11 is provided only for the second light source 3.

The dispersing element 4 is embodied, for instance, as a prism, especially a dispersing prism, a reflection grating, transmission grating, single- or double slit, fiber bundle, interference filter, or as a wavelength dependent mirror, especially as a dichroic mirror. Used as a variant of an optical grating can be a holographic grating or a focusing grating. A focusing grating is formed as a concave mirror and makes therewith especially other imaging elements unnecessary.

Preferably, the dispersing element 4 is so embodied that normal dispersion results. In a variant, however, also a dispersing element with abnormal dispersion is implementable.

The angle $\alpha$ is selected such that the broadband light 6 of the first light source 2 is so bent or refracted (depending on the type of dispersing element 4; see above) by the dispersing element 4 that only light 8 of a certain wavelength arrives at the light receiver 5. The angle $\alpha$ is selected such that only light of the first received wavelength arrives at the receiver. The remaining wavelengths are bent, refracted, scattered, reflected, etc. by the dispersing element 4 in other directions.

The angle $\beta$ is selected such that the broadband light 7 of the second light source 3 is so bent or refracted (depending on the type of dispersing element 4; see above) by the dispersing element 4 that only light 8 of a certain wavelength arrives at the light receiver 5. The angle $\beta$ is selected such that only light of the second received wavelength arrives at the receiver. The remaining wavelengths are bent, refracted, scattered, reflected, etc. by the dispersing element 4 in other directions.

For example, the angle $\alpha$, respectively $\beta$, is/are so selected that only blue, respectively red, light arrives at the receiver.

An option is that the light sources 2 and 3 transmit simultaneously, in order to produce therewith a mixed spectrum at the receiver 5.

The invention claimed is:

1. A measuring apparatus for measuring optical properties of a medium, comprising:

at least a first light source and a second light source for transmitting light, wherein said first light source and said second light source have the same emission spectrum, and said first light source and/or said second light source transmit(s) broadbandly;

one single light receiver for receiving light at least of a first received wavelength and a second received wavelength; and at least one dispersing element for bending and/or refracting light, wherein:

the light transmitted by the light sources directly strikes said dispersing element and is so turned by said dispersing element that it passes the medium and then strikes said light receiver;

said first light source is arranged at a first angle relative to said dispersing element and said second light source at a second angle relative to said dispersing element;

said second angle differs from said first angle;

said first angle is so embodied that the wavelength of the light turned by said dispersing element corresponds to the first received wavelength and said first angle is selected such that only light of the first received wavelength arrives at the receiver, wherein remaining wavelengths are bent, refracted, scattered or reflected by said dispersing element in other directions;

and said second angle is so embodied that the wavelength of the light turned by said dispersing element corresponds to the second received wavelength and said second angle is selected such that only light of the second received wavelength arrives at the receiver, wherein remaining wavelengths are bent, refracted, scattered or reflected by said dispersing element in other directions.

2. The measuring apparatus as claimed in claim 1, wherein:
said first light source and said second light source are LEDs.

3. The measuring apparatus as claimed in claim 1, wherein:
said first light source and said second light source are white LEDs.

4. The measuring apparatus as claimed in claim 1, wherein:
said light receiver is a broadband light receiver.

5. The measuring apparatus as claimed in claim 1, wherein:
said dispersing element is a prism, especially a dispersing prism, a reflection grating, a transmission grating, a single- or double slit, a fiber bundle, an interference filter, or a wavelength dependent mirror, especially a dichroic mirror.

6. The measuring apparatus as claimed in claim 1, wherein:
the measuring apparatus is a spectrometer, photometer or colorimeter.

7. The measuring apparatus as claimed in claim 1, wherein:
said first light source and said second light source transmit simultaneously.

8. A measuring apparatus for measuring optical properties of a medium, comprising:
at least a first light source and a second light source for transmitting light, wherein
said first light source and said second light source have the same emission spectrum, and
said first light source and/or said second light source transmit(s) broadbandly;
one single light receiver for receiving light at least of a first received wavelength and a second received wavelength;
at least one dispersing element for bending and/or refracting light; and
at least one collimating optic disposed between said first light source or said second light source and said dispersing element, wherein:
the light transmitted by the light sources strikes said dispersing element and is so turned by said dispersing element that it passes the medium and then strikes said light receiver;
said first light source is arranged at a first angle relative to said dispersing element and said second light source at a second angle relative to said dispersing element;
said second angle differs from said first angle;
said first angle is so embodied that the wavelength of the light turned by said dispersing element corresponds to the first received wavelength and said first angle is selected such that only light of the first received wavelength arrives at the receiver, wherein remaining wavelengths are bent, refracted, scattered or reflected by said dispersing element in other directions;
and said second angle is so embodied that the wavelength of the light turned by said dispersing element corresponds to the second received wavelength and
said second angle is selected such that only light of the second received wavelength arrives at the receiver, wherein remaining wavelengths are bent, refracted, scattered or reflected by said dispersing element in other directions.

9. The measuring apparatus as claimed in claim 8, wherein at least one collimating optic is disposed between said first light source and said second light source and said dispersing element.

10. The measuring apparatus as claimed in claim 8, wherein:
said first light source and said second light source transmit simultaneously.

* * * * *